United States Patent
Itoh

[11] 3,986,005
[45] Oct. 12, 1976

[54] ODOMETER FOR AN AUTOMOBILE

[75] Inventor: Akira Itoh, Kariya, Japan

[73] Assignee: Nippondenso Co., Ltd., Kariya, Japan

[22] Filed: Oct. 22, 1974

[21] Appl. No.: 517,061

[30] Foreign Application Priority Data
Nov. 8, 1973  Japan.......................... 48-129661[U]

[52] U.S. Cl.................................. 235/96; 235/103
[51] Int. Cl.² ........................................ G01C 22/00
[58] Field of Search................ 235/95 R, 96 R, 103, 235/117 R, 1 C; 58/125 C

[56] References Cited
UNITED STATES PATENTS

| | | | |
|---|---|---|---|
| 1,459,730 | 6/1923 | Harris | 235/95 R |
| 2,077,666 | 4/1937 | Bliss | 235/95 R |
| 3,516,603 | 6/1970 | Hachel | 235/95 R |
| 3,580,497 | 5/1971 | Powell | 235/96 R |
| 3,667,671 | 6/1972 | Hachtel | 235/96 R |
| 3,785,551 | 1/1974 | Regan | 235/95 R |

*Primary Examiner*—L. T. Hix
*Assistant Examiner*—Vit W. Miska
*Attorney, Agent, or Firm*—Cushman, Darby & Cushman

[57] ABSTRACT

An odometer for an automobile comprises a drive gear having a couple of projections, a plurality of numbered wheels whose least significant digit wheel has an internal gear, and a cam disposed between the drive gear and the least significant digit wheel, whereby the cam engages with and disengages from the internal gear teeth as the couple of the projections abut against the cam in response to the rotating direction of the drive gear, thus preventing the reversing of the numbered wheels.

5 Claims, 3 Drawing Figures

ODOMETER FOR AN AUTOMOBILE

BACKGROUND OF THE INVENTION

1. Field of the Invention

This invention relates to an odometer for an automobile, and more particularly, to an odometer having a drive mechanism for preventing the reversing of the numbered wheels, thereby to prevent lesser reading than that which was actually counted.

2. Description of the Prior Art

A conventional odometer having such a drive mechanism is described in U.S. Pat. No. 3,516,603, wherein a link member having a first and second tab therewith is disposed between a drive gear on which a spiral cam groove formed and a least significant digit wheel and wherein the first tab is urged to move along the spiral groove in response to the rotating direction of the drive gear so that the second tab engages with the internal gear teeth of the least significant digit wheel in the forward rotation and disengages in the backward rotation. In the construction described above, since the second tab engages with and disengages from the internal gear teeth on account of the eccentricity of the spiral groove a half turn of the wheel is needed for the second tab to engage with the internal gear teeth upon returning to the forward rotation from the backward rotation, which obstructs accurate counting.

SUMMARY OF THE INVENTION

The main object of the present invention is to provide an odometer which comprises a cam holder and a cam rotatably supported thereto for engaging with and disengaging from the internal gear teeth of the least significant digit wheel in response to the rotating direction of the drive gear, whereby the cam engages with the internal gear immediately after returning from the backward rotation, thereby to attain accurate counting with less delay.

Other objects features and advantages of the present invention will be made apparent by the following description with reference to the accompanying drawings.

DETAILED DESCRIPTION OF THE INVENTION

Figure 1:
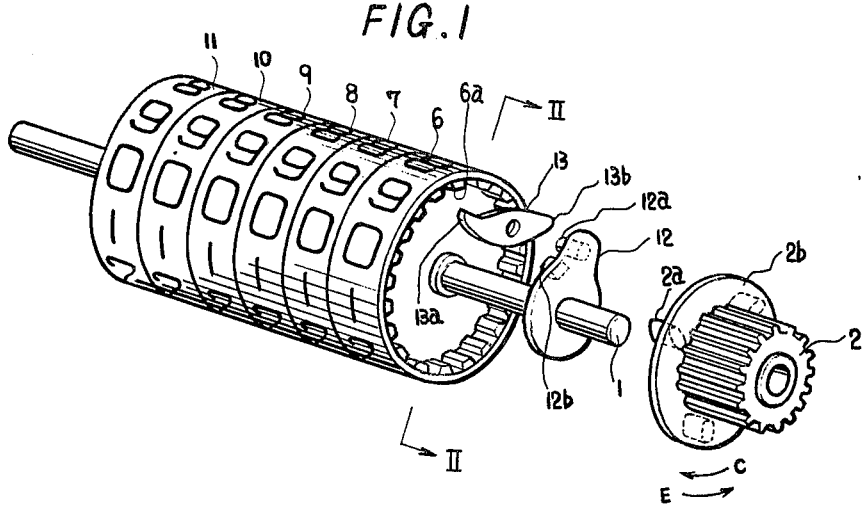
FIG. 1 is a perspective view of the drive mechanism separate from the numbered wheels.

Now referring to FIG. 1, a shaft 1 supported by the frame of the speedometer carries a drive gear 2 rotatably to which the wheel rotation is transmitted. The drive gear 2 has a disc plate 2b integrally formed therewith on which there are provided three projections designated by 2a. A plurality of numbered wheels 6, 7, 8, 9, 10 and 11 are placed side by side. The second significant digit wheel 7 turns 36° (one tenth of its full turn) as the least significant digit wheel 6 turns 360°, the third significant digit wheel turns 36° as the second significant digit wheel 7 makes its full turn and other wheels turn in the same manner as above to accumulate the running distance of an automobile. A cam holder 12 rotatably carried by the shaft 1 and disposed between the least significant digit wheel 6 and the disc plate 2b of the drive gear 2 is provided with a pin 12a for rotatably holding a cam 13 and a stopper 12b for defining disengaged position of the cam. The cam 13 is positioned between the two of the three projections 2a and so formed at its one end as to mate with the internal gear 6a of the least significant digit wheel 6.

Figure 2:
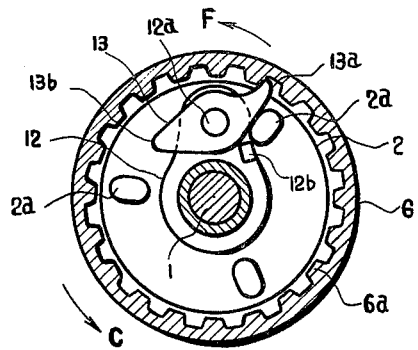
FIG. 2 is a sectional view looking in the direction of arrows II—II of FIG. 1 and showing the drive mechanism engaged.

When the vehicle is driven forward, the cam is urged at its one end 13a to rotate in the direction shown by an arrow F to engage with the internal gear 6a of the least significant wheel 6 as shown in FIG. 2. As the result, the rotation of the drive gear 2 is transmitted to the least significant digit wheel 6, which rotates in the direction shown by an arrow C in FIG. 2. The full turn of the wheel 6 makes the next digit wheel 7 turn by a single number (one tenth of the full turn). The full turn of the wheel 7 makes the next digit wheel 8 turn by a single number, and the wheel 8 does in the same manner as described above to thereby achieve an accumulation. When the vehicle is driven backward, the cam 13 is urged at its other end to rotate in the direction shown by an arrow G, thereby to disengage from the internal gear 6a of the wheel 6 and to abut against the stopper 12b of the cam holder 12. As the result the rotation is not transmitted to the least significant digit wheel 6, whereby the accumulated number in the forward direction is not reduced in the backward running of the vehicle.

Figure 3:
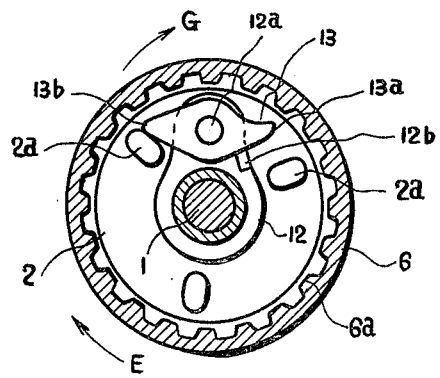
FIG. 3 is a sectional view looking in the same direction as above and showing the drive mechanism disengaged.

In the embodiment described above, the following advantage should be noted: even if the odometer is detached from the vehicle and the least significant digit wheel 6 is intended to rotate in the direction shown by an arrow E in FIG. 3 with an effort to reduce the accumulated number, the cam holder 12 rotates with the wheel 6 due to the friction inherent therebetween so that the cam 13 engages with the projection 2a and the internal gear 6a as shown in FIG. 2 with the result that the further rotation is disabled on account of the worm-reduction mechanism conventionally mounted in the odometer to reduce number of revolutions of the wheel rotation, thus preventing the accumulated number from being reduced. In the embodiment described above although three projections designated by 2a are provided for facilitating cam manufacture two projections can be substituted.

I claim:
1. An odometer for an automobile comprising:
   a drive gear to which wheel rotation is transmitted,
   a shaft,
   a plurality of numbered wheels carried rotatably by said shaft for accumulating the running distance of the automobile with the least significant digit wheel having internal gear teeth formed on the inner periphery thereof,
   wherein the improvement comprises:
   a cam holder rotatably carried by said shaft and disposed between said least significant digit wheel and said drive gear, and
   a cam pivotably mounted at a pivot point on said cam holder between said shaft and said internal gear teeth and so formed at one end extending from the pivot point as to mate with said internal gear teeth and cause rotation of said numbered wheels, and
   wherein said drive gear is provided with a disc plate having at least a pair of projections including a first projection for engaging said cam to pivot said cam in a first direction to cause said one end of said cam to mate with said internal gear teeth when the auto- mobile runs forward, and a second projection for engaging said cam to cause said cam to pivot in a direction opposite to said first direction and disengage said one end from said internal gear teeth when the automobile runs backward.

2. An odometer as in claim 1 wherein said cam has a second end extending oppositely from said pivot away from said one end, said second end engaging said second projection and said one end engaging said first projection.

3. An odometer for an automobile comprising:
a drive gear having at least a pair of separated projections for transmitting the wheel rotation of the automobile to the next stage,
a shaft,
a plurality of numbered wheels carried rotatably by said shaft for accumulating the running distance of the automobile with their least significant digit wheel having a gear teeth,
a cam holder rotatably carried by said shaft and disposed between said least significant digit wheel and said drive gear, and
a cam pivotably mounted at a pivot point on said cam holder between said shaft and said gear teeth for engaging with and disengaging from said internal gear teeth in response to the urge of one of said projections, whereby said wheel rotation is transmitted to said least significant digit wheel only when the automobile runs forward.

4. An odometer for an automobile comprising:
drive means having at least a couple of projections for transmitting the wheel rotation to the next stage,
means having a least significant digit wheel formed at its inner periphery gear teeth and other numbered wheels for accumulating the running distance of the automobile,
means disposed between said least significant digit wheel and said drive means for supporting a cam and rotatable about the axis of said accumulating means,
a cam rotatably supported by said supporting means and disposed between said projections and eccentrically to said axis for engaging with and disengaging from said gear teeth in response to the urge of one of said projections, whereby said wheel rotation is transmitted to said least significant digit wheel only when the automobile runs forward.

5. An odometer for an automobile comprising:
drive means having at least a couple of spaced apart projections for transmitting the wheel rotation of the automobile numbered wheel means having gear teeth for accumulating the running distance of the automobile, and
cam means disposed eccentrically to the axis of said drive means between said wheel means and said drive means and between said projections for engaging with and disengaging from said gear teeth in response to the abutment of one of said projections, whereby the said wheel rotation is transmitted when the automobile runs forward and prevented from being transmitted when the automobile runs backward, to said numbered wheel means.

* * * * *